United States Patent [19]

Tuznik et al.

[11] 4,157,942
[45] Jun. 12, 1979

[54] METHOD FOR RECOVERY OF METALS FROM METAL PLATING BATHS AND NEUTRALIZING TOXIC EFFLUENTS THEREFROM

[75] Inventors: Franciszek Tuznik; Andrzej Lis, both of Warsaw, Poland

[73] Assignee: Instytut Mechaniki Precyzyjnej, Warsaw, Poland

[21] Appl. No.: 770,026

[22] Filed: Feb. 18, 1977

[30] Foreign Application Priority Data

Mar. 8, 1976 [PL] Poland .................................. 18779

[51] Int. Cl.² .............................................. C25D 5/48
[52] U.S. Cl. .................................. 204/35 R; 204/238; 204/DIG. 13; 423/55
[58] Field of Search ................. 204/35 R, 237, 238, 204/239, 240, 241, DIG. 13; 106/315; 423/55

[56] References Cited

U.S. PATENT DOCUMENTS

| 3,617,567 | 11/1971 | Mathre ................................ 204/55 |
| 3,661,732 | 5/1972 | Withrow ...................... 204/DIG. 13 |
| 3,681,210 | 8/1972 | Zievers et al. ............... 204/DIG. 13 |
| 3,761,381 | 9/1973 | Yagishita ..................... 204/DIG. 13 |
| 3,896,209 | 7/1975 | Fournier et al. ........................ 423/55 |
| 3,947,283 | 3/1976 | Uchikawa et al. .................... 106/315 |
| 3,961,029 | 6/1976 | Senoo ..................................... 423/55 |
| 3,985,628 | 10/1976 | Myers ................................... 204/237 |

OTHER PUBLICATIONS

Kraljik, John; "Practical Guide to Treatment of Chromium Waste Liquors" Metal Finishing, Oct. 1975, pp. 49–55.
Chemical Week, Dec. 16, 1970, pp. 54–55, "Zeroing in on Plating Wastes".

Primary Examiner—John H. Mack
Assistant Examiner—William Leader
Attorney, Agent, or Firm—Eric P. Schellin

[57] ABSTRACT

Method for recovering metals from cyanide and hexavalent chromium plating baths comprising immersing plated articles in a reclaiming bath containing an aldehyde or an aldehyde percursor, and optionally an oxidizing agent, to precipitate the excess metal in the residual plating bath in the form of free metal or metal hydroxide and to decompose the cyanide and to reduce the hexavalent chromium to trivalent chromium. The plating bath and reclaiming bath are regenerated. Apparatus is provided to effect this process.

15 Claims, 1 Drawing Figure

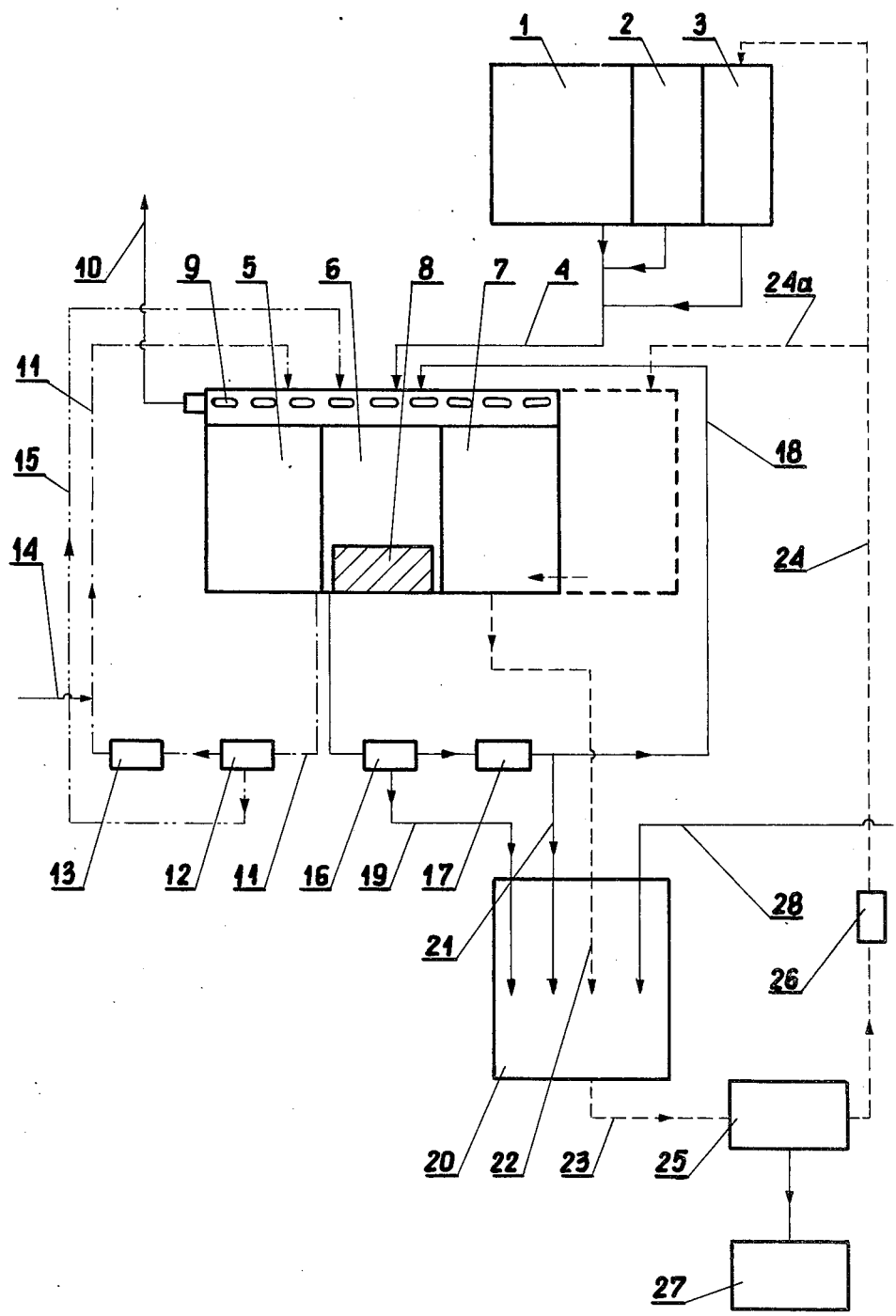

METHOD FOR RECOVERY OF METALS FROM METAL PLATING BATHS AND NEUTRALIZING TOXIC EFFLUENTS THEREFROM

BACKGROUND OF THE INVENTION

This invention relates to a method and apparatus for recovering metals from metal plating baths with simultaneous neutralization of toxic effluents.

After metals have been plated onto substrates, the plated substrates are rinsed to remove a residual film of the electroplating bath. If this residual film is not removed, the plated substrates cannot be subjected to further treatment. This film is most often removed by rinsing the plated substrate in water. This rinse water is discharged as effluent, along with the used plating baths.

The effluents are first separated into streams containing cyanide and streams containing chromate. The cyanide stream is subjected to oxidizing conditions and the chromate stream is subjected to reducing conditions, after which both streams are subjected to precipitation of metal hydroxides contained therein. This sludge of metal hydroxides is generally considered to be useless.

Oxidation of the cyanides is usually effected with chlorine, sodium hypochlorite, ozone, or other oxidizing agents. Reduction of hexavalent chromium is most often effected with sodium bisulfite or sodium metabisulfite. Because of the strongly exothermic nature of these reactions and the possible evolution of toxic compounds, the concentration of cyanides in solutions to be treated should not exceed one gram per liter, and the concentration of hexavalent chromium in solutions to be treated should not exceed ten grams per liter.

Existing plating-effluents treatment plants utilize the aforesaid oxidizing and reducing agents, and the plants differ solely in the type of equipment used. Equipment in use includes concrete tanks sunk into the ground to receive by gravity the effluents from a metal finishing shop, free-standing reaction tanks into which effluents are mechanically pumped, or fully automated flow-through treatment plants using ion exchange or the Lancy process.

The Lancy process involves chemically rinsing the plated articles with dilute acid or alkaline solutions of the oxidizing or reducing agents used to treat the effluents, rather than rinsing the plated articles with water. In this process, the precipitation and separation of the sludge is effected within settling tanks located beyond the plating line.

With any of the methods described above, the sludge (mixture of metal hydroxides) precipitated during the final neutralization stage is concentrated by means of a filter press or a vacuum filter. This concentrated sludge is difficult to dispose of and cannot be reused.

Another important problem in metal finishing shops is treatment of the fumes exhausted by the ventilating system from the plating tanks. Treatment of these fumes is generally neglected for lack of appropriate methods and equipment.

Metals from concentrated plating solutions and effluents are mainly recovered by ion-exchange, electrodialysis, electrolysis, reverse osmosis, ultrafiltration, evaporation and the like. For concentrated solutions, these methods are impractical.

The aforesaid methods of effluent treatment in the metal finishing industry are used for the automatic and semi-automatic plating shops, as well as for manually operated plating shops. Existing methods of treatment of effluent from the plating shops, as well as recovery of metals therefrom, include no practical possibilities for treatment of toxic compounds exhausted by the ventilation system.

SUMMARY OF THE INVENTION

The present invention provides a method and apparatus for thorough neutralization of all plating bath solutions and effluents and for full recovery of used plating metals. Hexavalent chromium is reduced to trivalent chromium with production of chromium hydroxide. Metals such as zinc and cadmium are recovered as their respective hydroxides; silver and copper are recovered as free metals. Additionally, the present invention provides for neutralization of cyanide and chromic fumes exhausted from the reclaiming tanks.

According to the present invention, the pH of the reclaiming bath is adjusted from 3.0 to 13.0, and an aldehyde, and/or ozone, is introduced into the reclaiming bath. The aldehyde may be introduced in the form of an aldehyde, a compound which will release an aldehyde in the reclaiming bath, or an ammonium aldehyde. The weight ratio of aldehyde to metal in the reclaiming bath ranges from 1:1 up to 1:50.

The fumes from the reclaiming tank are introduced into the fume extraction ducts which carry the cyanide fumes in the form of hydrogen cyanide. In the case of the chromium solution, a scrubber is provided behind the exhaust hoods to reduce the chromium with fumes from the reclaiming tank. Regeneration of the plating bath, the reclaiming bath, and the rinse water is effected according to conventional methods.

The apparatus according to the present invention comprises three interconnected units. The first (preparatory) unit comprises the equipment for introducing the reagents into the reclaiming bath. The second (treatment) unit comprises several tanks, or several chambers within one tank, which include equipment for filtration and precipitation within the closed-loop system of the plating bath and the reclaiming bath. The third unit comprises the reactor for pH adjustment and the water recovery installation, including piping and control systems.

The method and apparatus of the present invention provide for disposal of all of the post-reaction solutions and rinse water effluents via the common drain system to the final pH-adjustment unit. By the time the effluent reaches the drain system, the effluent is free of cyanide and hexavalent chromium as well as of heavy metals such as silver, copper, chromium, zinc, cadmium, and nickel. As filtration and purification of the plating bath, the reclaiming bath, and the rinse water are carried out within the closed-loop system, consumption of fresh water is reduced to 2–10% of the amount required in present systems.

Articles which have been electroplated in cyanide baths, such as those plated in zinc, silver, copper, cadmium or chromium baths, are transferred into a reclaiming tank containing an aqueous solution of from about 1% to 40% by weight of an aldehyde having the following formula:

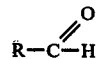

or from about 1% to 40% by weight of an aldehyde-forming compound having the formula:

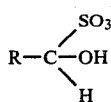

or from about 1% to 40% by weight of an aldehyde ammonia having the following formula:

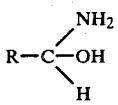

wherein R is an aromatic group or hydrogen.

The solution in the reclaiming tank also contains from about 0% to 40% by weight of hydrogen peroxide or from about 0% to 20% by weight of ozone.

In the case of poor sludge sedimentation, up to 1% by weight of a flocculating agent such as starch or a polyacrylamide compound may be added to the aqueous solution in the reclaiming tank. In the case of poor sludge filtration, up to 1% by weight of a coagulant such as bentonite or salts of iron, aluminum, or magnesium may be added to the aqueous solution in the reclaiming tank.

The solution in the reclaiming tank causes decomposition of the cyanides, reduction of chromium, precipitation of metallic silver or copper, and precipitation of zinc, cadmium or chromium as hydroxides, viz., $Zn(OH)_2$, $Cd(OH)_2$, $Cr(OH)_3$.

After the treatment in the reclaiming tank, the plated articles are transferred into one or more of the successively arranged tanks where the residue from the reclaiming bath is rinsed out by water. The article is then dried by conventional means.

The sludges left in the plating bath are continuously transferred to the filter wherefrom the filtered plating bath is recirculated to the plating tank and the filtrate is circulated to the reclaiming tank to precipitate the remainder of the metals to be recovered. In the event the spent plating bath must be changed, it should be discharged via the same drain system and pumped without filtration to the reclaiming bath for its decomposition.

The precipitated free metals and metal hydroxides from the reclaiming bath are collected in a container located in the reclaiming tank. This container, when it is filled up, is replaced with an empty container. The reclaiming bath is periodically transferred to the filter from which the sludge is discharged into the reactor for pH adjustment, and the filtered solution is pumped back to the reclaiming tank. The rinse water is continuously transferred to the reactor for pH adjustment. Then, the neutralized effluents are transferred to the water recovery installation, which can be an evaporator, an ion-exchange unit, an ultrafiltration unit, or a reverse osmosis unit. From the water recovery installation, water is recirculated to the water rinse tanks and to the tank part of the preparatory-dosing unit. The solid or semi-solid waste from the water recovery unit is discharged into a final container for mixing with pure cement.

BRIEF DESCRIPTION OF THE DRAWING

The drawing illustrates the apparatus of the present invention, comprising a preparatory-dosing unit, a treatment unit, and a water recovery unit.

The preparatory-dosing unit comprises one tank with three chambers, 1, 2 and 3, or three tanks placed next to each other. Chamber 1 is for the reagents, chamber 2 is for flocculating agent and/or coagulant, and chamber 3 is for water. The chambers are connected via pipe works equipped with control valves (not shown in the drawing) with conduit 4 for introducing the mixture into the reclaiming bath. The treatment unit comprises at least three chambers (or tanks) 5, 6 and 7. Chamber 5 is for the plating bath. Reclaiming bath chamber 6 has a container 8 provided in the bottom of the chamber to collect precipitated free metals or metal hydroxides. Chamber 7 holds water to provide a water rinse by any conventional method. These three chambers, 5, 6 and 7, are provided with a common hood 9 to exhaust fumes from the region over the plating bath and the reclaiming bath surface so that the fumes from the reclaiming bath can react in a gaseous phase with hydrogen cyanide evolved, or with hexavalent chromium in a liquid phase, in the scrubber (not shown in the drawing) provided behind the hoods. The neutralized fumes are discharged by ducts 10 to the general ventilation system.

Filtration of the plating bath is effected through a conduit 11, a filter 12, and a pump 13. Conduit 14 is connected to conduit 11 to supply fresh plating solution periodically to chamber 5. Purified filtrate is pumped back in the closed-loop system into chamber 5, and the filtration residue is transferred from the filter 12 through a conduit 15 to reclaiming bath chamber 6.

The system for filtering the reclaiming bath comprises a filter 16, a pump 17, and a cnduit 18. The bath is filtered in the closed-loop system and transferred into the chamber 6. The contaminations left on the filter 16 are removed via the conduit 19 to the reactor 20 for pH adjustment, the latter being supplied via the conduit 21 with a portion of the filtered bath in an amount to be established according to the quantity as supplied via the conduit 4 and as evaporated and spent in the reactions within the chamber 6.

The water regeneration system comprises the conduits 22, 23, 24 and 24a; the pH-adjustment reactor 20; the water recovery unit 25 and the pump 26. The pretreated effluents from other sections of the apparatus are transferred via conduit 28 to the reactor 20. From the recovery unit 25 the particulate material removed from water from reactor 20 is transferred to chamber 27, where the particulate material is mixed with cement.

DETAILED DESCRIPTION OF THE INVENTION

EXAMPLE I

Articles having a surface area of 2.5 square meters were silver plated in a bath containing an aqueous solution of the following composition: 33 g/l AgCl, 38 g/l KCN, and 50 g/l $K_2CO_3$. The drag-out from the bath has been determined to be 0.20 liter per square meter of solution.

The reclaiming tank was filled with a 40% aqueous solution of formaldehyde, and the bath pH adjusted to 11.0. After rinsing of the articles in the reclaiming tank, the dried weight of precipitated silver was 12.5 g., and subsequent chemical analysis showed no cyanides in the effluent. This indicates that 7.6 g. of cyanide had been decomposed.

EXAMPLE II

Articles having a surface area of 2.5 square meters were silver plated in a bath having the same composition as that of Example I.

The reclaiming tank was filled with a 40% aqueous solution of benzaldehyde, and the bath pH was adjusted to 10.5. After rinsing of the articles in the reclaiming tank, the dried weight of precipitated silver was 12.5 g., and subsequent chemical analysis showed no trace of cyanide in the effluent.

EXAMPLE III

Articles having a surface area of 2.5 square meters were silver plated in a bath having the same composition as that of Example I.

The reclaiming tank was filled with an aqueous solution of 30% benzaldehyde and 10% ozone, and the pH of the bath was adjusted to 10.5. After rinsing of the articles in the reclaiming tank, the dried weight of precipitated silver was 12.5 g., and subsequent chemical analysis showed no trace of cyanide in the effluent.

EXAMPLE IV

Articles having a surface area of 2.5 square meters were placed in a bath having the same composition as that of Example I.

The reclaiming tank was filled with an aqueous solution of 20% cinnamaldehyde aldehyde ammonia, 20% hydrogen peroxide, and 0.5% polyacrylamide, and the pH of the bath was adjusted to 11.5. After rinsing of the articles in the reclaiming tank, the dried weight of precipitated silver was 12.5 g., and subsequent chemical analysis showed no trace of cyanide in the effluent.

EXAMPLE V

Articles having a surface area of 4.0 square meters were copper plated in a bath containing an aqueous solution of the following composition: 28 g/l $CuCN$, 20 g/l $NaCN$, 15 g/l $Na_2CO_3$, and 20 g/l $NaOH$. The drag-out from the bath was determined to be 0.15 liter per square meter of solution.

The reclaiming tank was filled with a 40% aqueous solution of cinnamaldehyde, and the pH of the bath was adjusted to 11.0. After rinsing of the articles in the reclaiming tank, the dried weight of the precipitated copper was 12 g., and subsequent chemical analysis showed no cyanide in the effluent. From this, it was determined that 4.8 g. of cyanide were decomposed.

EXAMPLE VI

Articles having a surface area of 4.0 square meters were copper plated in a bath according to Example V.

The reclaiming tank was filled with an aqueous solution containing 20% formaldehyde, 20% hydrogen peroxide, and 1% ferric chloride, and the pH of the bath was adjusted to 13.0. After rinsing of the articles in the reclaiming tank, the dried weight of the precipitated copper was 12 g., and subsequent chemical analysis showed no trace of cyanide in the effluent.

EXAMPLE VII

Articles having a surface area of 4.0 square meters were copper plated in a bath according to Example V.

The reclaiming tank was filled with an aqueous solution of 40% cinnamaldehyde sulfite and 0.3% starch, and the pH of the bath was adjusted to 11.5. After rinsing of the articles in the reclaiming tank, the dried weight of precipitated copper was 12 g., and subsequent chemical analysis showed no trace of cyanide in the effluent.

EXAMPLE VIII

Articles having a surface area of 5.0 square meters were zinc plated in a bath containing an aqueous solution of the following composition: 40 g/l $ZnO$, 100 g/l $NaCN$, and 40 g/l $NaOH$. It was determined that the drag-out of the bath was 0.5 liter per square meter.

The reclaiming tank was filled with an aqueous solution containing 30% formaldehyde, 10% hydrogen peroxide, and 1% magnesium chloride, and the pH of the bath was adjusted to 11.0. After rinsing of the articles in the reclaiming tank, the dried weight of the precipitated zinc oxide was 20.0 g., and subsequent chemical analysis showed no cyanide in the effluent. This indicated that 53 g. of cyanide were decomposed.

EXAMPLE IX

Articles having a surface area of 5.0 square meters were zinc plated in a bath according to Example VIII.

The reclaiming tank was filled with an aqueous solution of 40% hydrogen peroxide and 0.5% polyacrylamide, and the pH of the bath was adjusted to 11.0. The dried weight of the precipitated zinc oxide was 20.0 g., and subsequent chemical analysis showed no trace of cyanide in the effluent.

EXAMPLE X

Articles having a surface area of 5.0 square meters were zinc plated in a bath according to Example VIII.

The reclaiming tank was filled with an aqueous solution of 20% ozone and 1% starch and the pH of the bath was adjusted to 12.0. After rinsing of the articles in the reclaiming tank, the dried weight of the precipitated zinc oxide was 20.0 g., and subsequent analysis showed no trace of cyanide in the effluent.

EXAMPLE XI

Articles having a surface area of 5 square meters were cadmium plated in an aqueous bath having the following composition: 50 g/l $Cd(CN)_2$, 100 g/l $NaCN$, and 10 g/l $NaOH$. The drag-out from the bath was determined to be 0.1 liter per square meter.

The reclaiming tank was filled with an aqueous solution of 40% formaldehyde and 1% ferrous chloride, and the pH of the bath was adjusted to 12.0. After rinsing of the articles in the reclaiming tank, the dried weight of the precipitated cadmium hydroxide was 17.1 g., and subsequent chemical analysis showed no trace of cyanide in the effluent. This indicated that 34.4 g. of cyanide were decomposed.

EXAMPLE XII

Articles having a surface area of 5 square meters were cadmium plated in a bath according to Example XI.

The reclaiming tank was filled with an aqueous solution of 20% benzaldehyde and 20% hydrogen peroxide, and the pH of the bath was adjusted to 12.0. After rinsing of the articles in the reclaiming tank, the dried weight of the precipitated cadmium hydroxide was 17.1 g., and subsequent chemical analysis showed no trace of cyanide in the effluent.

EXAMPLE XIII

Articles having a surface area of 5 square meters were cadmium plated in a bath according to Example XI.

The reclaiming tank was filled with an aqueous solution of 40% hydrogen peroxide and 0.5% polyacrylamide, and the pH of the bath was adjusted to 11.5. After rinsing of the articles in the reclaiming tank, the dried weight of the precipitated cadmium hydroxide was 17.1 g., and subsequent chemical analysis showed no trace of cyanide in the effluent.

EXAMPLE XIV

Articles having a surface area of 4 square meters were chromium plated in an aqueous bath of the following composition: 300 g/l $CrO_3$ and 3 g/l $H_2SO_4$. The drag-out from the bath was determined to be 0.25 liter per square meter of solution.

The reclaiming tank was filled with a 40% aqueous solution of benzaldehyde sulfite, and the pH of the bath was adjusted to 7.0. After rinsing of the articles in the reclaiming tank, the dried weight of the precipitated chromium hydroxide was 156 g.

EXAMPLE XV

Articles having a surface area of 4 square meters were chromium plated in a bath according to Example XIV.

The reclaiming tank was filled with an aqueous solution of 20% hydrogen peroxide and 20% formaldehyde, and the pH of the bath was adjusted to 7. After rinsing of the articles in the reclaiming tank, the dried weight of the precipitated chromium hydroxide was 156 g.

EXAMPLE XVI

Articles having a surface area of 4 square meters were chromium plated in a bath according to Example XIV.

The reclaiming tank was filled with an aqueous solution of 40% formaldehyde and 1% ferric chloride, and the pH of the bath was adjusted to 7. After rinsing of the articles in the reclaiming tank, the dried weight of the precipitated chromium hydroxide was 156 g.

What is claimed is:

1. A method for plating articles with recovery of metals from metal plating baths and constant recycling of water comprising:
    A. electroplating articles in a plating bath selected from the group consisting of cyanide plating baths and hexavalent chromium baths;
    B. treating said plated articles in an aqueous reclaiming solution having a pH from 3 to 13 comprising:
        (a) from about 1% to about 40% by weight of a compound selected from the group consisting of (1) aldehydes of the formula

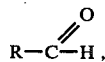

(2) aldehyde sulfites of the formula

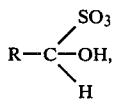

and (3) aldehyde ammonias of the formula

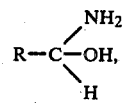

wherein R is selected from the group consisting of hydrogen and aromatic groups;
        (b) from 0% to 40% by weight of hydrogen peroxide;
        (c) from 0% to 20% by weight of ozone;
        (d) from 0% to about 1% of a flocculating agent selected from the group consisting of starch and polyacrylamides;
        (e) from 0% to about 1% by weight of a coagulating agent selected from the group consisting of bentonite, iron salts, aluminum salts, and magnesium salts;
    C. collecting precipitates resulting from said reclaiming treatment;
    D. filtering spent reclaiming solution and returning filtered reclaiming solution for reuse;
    E. rinsing with water the articles subjected to reclaiming treatment;
    F. adjusting the pH of spent rinse water;
    G. transferring the spent rinse water from the pH adjustment to a water recovery installation;
    H. recovering and recirculating the spent rinse water and discharging the solid or semi-solid waste collected in the water recovery installation;
    I. mixing fumes exhausted from the plating solution with fumes from the reclaiming solution to neutralize the fumes from the plating solution; and
    J. continuously recirculating the plating bath within a closed-loop system through a filter, wherefrom the filtration residue deposited upon the filter is transferred to the reclaiming solution and the filtered plating bath is returned to the plating path.

2. The method of claim 1, wherein the solid or semi-solid waste from the water recovery unit is mixed with pure cement.

3. The method of claim 1, wherein the reclaiming solution comprises from about 1% to about 40% of formaldehyde.

4. The method of claim 1, wherein the reclaiming solution comprises from about 1% to 40% benzaldehyde.

5. The method of claim 4, wherein the reclaiming solution also contains from 1% to 40% hydrogen peroxide.

6. The method of claim 4 wherein the solid or semi-solid waste from the water recovery unit is mixed with pure cement.

7. Apparatus for plating metals with simultaneous recovery of metals and neutralization of toxic effluents comprising:
    A. preparatory dosing means, connected by means for communication for liquid flow;
    B. treatment means provided with a means for removing noxious fumes produced by the metal plating process, connected by a means for communication for a liquid flow to a
    C. water regeneration means.

8. The apparatus of claim 7 wherein the preparatory dosing means comprises three chambers: a first chamber means for reagents; a second chamber means for flocculating agents and coagulants; and a third chamber means for water.

9. The apparatus of claim 7 wherein the treatment means comprises three chamber means: a first chamber means for plating bath; a second chamber means for reclaiming bath; and a third chamber means for water.

10. The apparatus of claim 9 wherein the first chamber means is equipped with a closed-loop conduit containing filtering means.

11. The apparatus of claim 9 wherein filtering means are connected by means for communication for liquid flow to the second chamber means.

12. The apparatus of claim 9 wherein the second chamber means is equipped with means to receive precipitates formed in the second chamber means during reclamation.

13. The apparatus of claim 10 wherein the second chamber means is equipped with means for receiving filtrate from the filtering means in communication with the first chamber means.

14. The apparatus of claim 13 wherein the second chamber means is equipped with a means for receiving spent plating bath.

15. The apparatus of claim 7 wherein the water regeneration means includes a water recovery means and a means to adjust pH, the means to adjust pH being connected to the preparatory dosing means via means for communication for a liquid flow.

* * * * *